UNITED STATES PATENT OFFICE.

GUSTAVE DITTMAR, OF WASHINGTON, DISTRICT OF COLUMBIA.

BLASTING COMPOUND.

No. 798,398. Specification of Letters Patent. Patented Aug. 29, 1905.

Application filed January 11, 1902. Serial No. 89,373.

*To all whom it may concern:*

Be it known that I, GUSTAVE DITTMAR, a citizen of the United States, residing at 606 F street northwest, Washington, District of Columbia, have invented certain new and useful Improvements in Blasting Compounds; and I do hereby declare the following to be a full, clear, and exact description of the invention, such as will enable others skilled in the art to which it appertains to make and use the same.

My invention relates to explosive compounds of which nitroglycerin is the basis, the object of the invention being the production of an explosive compound of this character which shall not be injuriously affected by frost and which may be handled without danger in the loading of guns, the charging of shells, or in depositing into blasting holes or crevices, but which shall act as a high explosive when suitably used for this purpose.

My invention comprises both the process of making the improved explosive compound and also the new explosive compound itself which is obtained by the process.

My invention is based upon the recognition of the fact that nitroglycerin may be heated up to 180° centigrade, which is its boiling-point, without danger of spontaneous explosion, and that at any temperature sensibly below 180° centigrade nitroglycerin can be intimately mixed with certain fatty or resinous substances which melt at these lower temperatures and while they are in the molten condition, and that the nitroglycerin will then be retained in the congealed mass of the fatty or resinous substance and will not percolate through it, although contained in the same at a percentage which renders the whole mass a high explosive.

The process of making my improved explosive compound is as follows: I take stearin, paraffin, or other fatty substance which melts at a temperature considerably below 180° centigrade, or I take rosin or mixtures of two or more of these substances and heat them until they are in a fluid state, but taking care that the temperature of the fused mass is safely below the boiling-point of nitroglycerin. In this fused mass while in a liquid condition I gradually pour a requisite quantity of nitroglycerin which has been previously heated in a water-bath or otherwise up to 50° or 60° centigrade, and while the nitroglycerin is gradually poured in the whole mass is thoroughly mixed by stirring until the nitroglycerin is thoroughly diffused throughout the mass. I then allow the mass to gradually cool, but continue the stirring operation until the mass has attained the normal temperature—that is to say, the temperature at which it congeals. The consistency of the mass thus obtained depends upon the percentage of nitroglycerin with reference to the weight of the whole mass. A comparatively small percentage of nitroglycerin will yield a very solid compound in the shape of granules into which the mass is broken up by the stirring action, while a comparatively large percentage of nitroglycerin will yield a compound that is rather plastic, so that it will take the form of any vessel in which it may be placed.

I have found that if I use fifty per cent. of paraffin or stearin or rosin, or a mixture of these and fifty per cent. of nitroglycerin I obtain a compound that is solid; but when I use seventy per cent. of nitroglycerin and thirty per cent. of fatty or resinous substance the resulting compound will be rather plastic, and in this condition it is particularly adapted for blasting purposes.

I may with advantage incorporate into the compound which I have described a nitrate of an alkali, sulfur, and charcoal in quantities ordinarily used in the manufacture of gunpowder, and by preference I use nitrate of ammonia as the oxidizing agent, its hygroscopic property being neutralized by its diffusion in and protection by the fatty or resinous mass. The gunpowder ingredients are added before the nitroglycerin is poured into the molten mass of fatty or resinous substances or mixtures thereof, which acts as the vehicle or carrier of the nitroglycerin.

The article obtained by my process is characterized by the fact that the nitroglycerin, which is uniformly distributed in the vehicle in distinct particles, is surrounded and inclosed by the fused vehicle in such manner that each particle is isolated from the others by a wall of the fused vehicle, or, in other words, is hermetically encapsuled by the same.

It has heretofore been attempted to obtain an explosive compound by distributing nitroglycerin throughout a mass of a resinous substance which was deposited out of a suitable solvent; but the article thus obtained is remarkably different from the article obtained by my process. Resinous and like substances obtained as a deposit from a solvent are physically distinct from like substances that have been fused and then allowed to congeal, the former being distinctly porous, while the latter are characterized by great density, and as a vehicle for nitroglycerin they prevent the percolation through them of this fluid. It has also been attempted to subdivide paraffin and other vehicles and then to mix and knead it together with a quantity of nitroglycerin; but the mass thus obtained is distinctly cellular and the nitroglycerin percolates through the same and separates from the vehicle.

Having now fully described my invention, what I claim is—

1. An explosive preparation consisting of nitroglycerin distributed and embedded in a fused carrier, substantially as described.

2. An explosive compound consisting of nitroglycerin distributed and embedded in fused paraffin, substantially as described.

3. An explosive compound consisting of nitroglycerin and the ingredients of gunpowder uniformly distributed in a fused carrier, substantially as described.

4. An explosive compound consisting of nitroglycerin and the ingredients of gunpowder uniformly distributed and embedded in fused paraffin, substantially as described.

5. An explosive compound consisting of nitroglycerin, and the constituents of gunpowder in which nitrate of ammonia is the oxidant, distributed and embedded in a fused carrier, substantially as described.

6. An explosive compound consisting of nitroglycerin, and the constituents of gunpowder in which nitrate of ammonia is the oxidant, distributed and embedded in fused paraffin, substantially as described.

In testimony whereof I have affixed my signature, in the presence of two witnesses, this 11th day of January, 1902.

GUSTAVE DITTMAR.

Witnesses:
M. F. ROY,
GEO. HEINICKE.